(12) United States Patent
Ha et al.

(10) Patent No.: US 8,767,255 B2
(45) Date of Patent: Jul. 1, 2014

(54) IMAGE FORMING APPARATUS AND RESOURCE SAVING MODE CONTROL METHOD THEREOF

(75) Inventors: Kwang-Soo Ha, Seoul (KR); Sung-Jae Chung, Seoul (KR); Bong-Gun Kim, Yongin-si (KR); Sang-Su Lee, Seoul (KR); Sung-Man Shin, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 988 days.

(21) Appl. No.: 12/801,693

(22) Filed: Jun. 21, 2010

(65) Prior Publication Data

US 2011/0116108 A1   May 19, 2011

(30) Foreign Application Priority Data

Nov. 13, 2009   (KR) .................. 10-2009-0109872

(51) Int. Cl.
*G06F 15/00* (2006.01)
*G06F 3/12* (2006.01)
*H04N 1/00* (2006.01)
*G06F 17/00* (2006.01)
*G06F 1/26* (2006.01)

(52) U.S. Cl.
USPC ......... 358/1.9; 358/1.13; 358/1.15; 358/3.24; 358/401; 358/406; 358/448; 358/468; 358/305; 399/24; 399/27; 399/28; 399/38; 399/75; 399/79; 399/81; 399/82; 399/85; 399/138; 399/411; 705/400; 713/320; 715/273; 715/833

(58) Field of Classification Search
CPC combination set(s) only.
See application file for complete search history.

(56) References Cited

U.S. PATENT DOCUMENTS

| | | | |
|---|---|---|---|
| 2002/0071689 A1* | 6/2002 | Miyamoto | 399/53 |
| 2004/0067084 A1* | 4/2004 | Zerza et al. | 400/76 |
| 2005/0063749 A1* | 3/2005 | Harris et al. | 400/62 |
| 2008/0008508 A1* | 1/2008 | Mizobuchi et al. | 399/389 |
| 2008/0037058 A1* | 2/2008 | Ban | 358/1.15 |
| 2008/0198398 A1 | 8/2008 | Sasamae | |

FOREIGN PATENT DOCUMENTS

JP   2004-004296   1/2004
KR   10-2007-0089572   8/2007

* cited by examiner

*Primary Examiner* — King Poon
*Assistant Examiner* — Vincent Peren
(74) *Attorney, Agent, or Firm* — Staas & Halsey LLP

(57) ABSTRACT

A control method of an image forming apparatus which is connected to an external apparatus, supports a resource saving mode, and outputs document data is provided. The control method includes: selecting the document data to be output, selecting an output option to be applied to the selected document data, comparing a resource saving value corresponding to the output option to be applied to the document data and a resource saving set value which is pre-set in the image forming apparatus, displaying at least one suggestion option to save resources of the document data according to a result of comparison, and selecting one of the displayed suggestion option and outputting the document data.

18 Claims, 13 Drawing Sheets

FIG. 6A

| | Toner | Maximum Dot Count | Price |
|---|---|---|---|
| Color Laser Printer C01 | Cyan | 4,000,000,000 | 110$ |
| | Magenta | 4,000,000,000 | 110$ |
| | Yellow | 4,000,000,000 | 110$ |
| | Black | 4,000,000,000 | 100$ |
| Color Laser Printer C02 | Cyan | 10,000,000,000 | 220$ |
| | Magenta | 10,000,000,000 | 220$ |
| | Yellow | 10,000,000,000 | 220$ |
| | Black | 10,000,000,000 | 200$ |
| Mono Laser Printer M01 | Black | 4,000,000,000 | 100$ |

FIG. 6B

| | Printing Cost per Page |
|---|---|
| Color | 0.30 $ |
| Mono | 0.10 $ |
| Paper | 0.01 $ |

IMAGE FORMING APPARATUS AND RESOURCE SAVING MODE CONTROL METHOD THEREOF

CROSS-REFERENCE TO RELATED APPLICATION

This application claims the benefit of Korean Patent Application No. 10-2009-0109872, filed on Nov. 13, 2009, in the Korean Intellectual Property Office, the disclosure of which is incorporated herein by reference.

BACKGROUND

1. Field

Aspects relate to an image forming apparatus which is capable of saving resources and a resource saving mode control method thereof, and more particularly, to an image forming apparatus which provides a suggestion option to save resources and a control method thereof.

2. Description of the Related Art

As the use of computers increases, peripherals for the computers are increasingly used. Representative examples of computer peripherals are printers, scanners, copiers, and multifunction peripherals which incorporate at least two functions of the aforementioned devices. In a printing environment, the more a user uses consumables, the more benefit a manufacturer obtains. However, in a recent printing environment, an increase of cost caused by use of consumables is a negative factor that affects profit of a business. Also, an eco-friendly factor has been increasingly introduced in the printing environment as laws protecting the environment and consumer awareness have become more common.

However, a related-art eco-friendly technique treats only a simple function such as a toner saver and allows only a restrictive use such that only a function that is already registered by an administrator is used independent of a user's wish. Therefore, the related-art eco-friendly technique does not derive an efficient use and an eco feature forcedly used in an actual situation does not derive active participation from a user, thereby causing inconvenience to the user. Particularly, in the case of a commonly used device such as a multifunction peripheral, user's participation is low and a user does not show a strong attachment to the process. An important factor of such a device from a standpoint of suppliers is to reduce a cost by saving consumables and foster user's participation to maintain the device's function. Also, from a user's standpoint, there is a demand for a method providing a suitable eco interface to derive active participation from a user without making the user feel passive participation, and providing satisfaction for the active participation and also using a device efficiently.

SUMMARY

Accordingly, it is an aspect to provide an image forming apparatus which provides a suggestion option saving resources and a resource saving mode control method thereof.

Additional aspects and/or advantages will be set forth in part in the description which follows and, in part, will be apparent from the description, or may be learned by practice of the invention.

The foregoing and/or other aspects are achieved by providing a control method of an image forming apparatus which is connectable to an external apparatus, supports a resource saving mode, and outputs document data, the control method including: selecting the document data to be output, selecting an output option from among output options, to be applied to the selected document data, comparing a resource saving value corresponding to the output option to be applied to the document data and a resource saving set value which is pre-set in the image forming apparatus, displaying at least one suggestion option saving resources of the document data according to a result of comparing, and selecting one of the displayed suggestion options and outputting the document data according to the selected option.

The suggestion option may be displayed if the resource saving value corresponding to the output option to be applied to the document data is less than the pre-set resource saving set value.

The output option may include at least one of a duplex output option, a multiple-pages-per-sheet output option, a size reduction printing option, a monochrome output option, a toner saving/density control option, a printing quality/resolution option, a batch output option, a blank page deletion option, and a background deletion option.

The control method may further include calculating the resource saving value corresponding to the output option to be applied to the document data.

The suggestion option may be at least one output option that satisfies the pre-set resource saving set value or at least one combination of the at least one output option.

The control method may further include displaying the resource saving value corresponding to the output option to be applied to the document data and the pre-set resource saving set value as a saving cost.

The control method may further include inputting a user command to change the pre-set resource saving set value, and the changed resource saving set value may be input by manipulating a scroll bar or inputting a numerical value.

The control method may further include, if the resource saving set value is changed according to the user command, displaying a suggestion option corresponding to the changed resource saving set value.

The document data to be output may include at least one of pre-stored document data, printing data received from the external apparatus connected to the image forming apparatus, received fax data, received e-mail, a document to be copied, and a document to be scanned.

A screen to display the suggestion option may be displayed as a separate window from a currently displayed screen.

The foregoing and/or other aspects may also be achieved by providing an image forming apparatus which is connectable to an external apparatus, supports a resource saving mode, and outputs document data, the image forming apparatus including: a communication interface to communicate with the external apparatus, an input unit to select the document data to be output and select an output option from a plurality of output options to be applied to the selected document data, a display unit to display suggestion options to save resources, an output unit to output the document data according to a suggestion option that is selected from among the displayed suggestion options, and a controller to compare a resource saving value corresponding to the output option to be applied to the document data and a resource saving set value which is pre-set in the image forming apparatus, control the display unit to display at least one suggestion option to save the resources of the document data according to a result of a comparison, and control the output unit to output the document data according to a suggestion option that is selected from among the displayed suggestion options.

The controller may control the suggestion option to be displayed if the resource saving value corresponding to the output option to be applied to the document data is less than the pre-set resource saving set value.

The output option may include at least one of a duplex output option, a multiple-pages-per-sheet output option, a size reduction printing option, a monochrome output option, a toner saving/density control option, a printing quality/resolution option, a batch output option, a blank page deletion option, and a background deletion option.

The controller may calculate the resource saving value corresponding to the output option to be applied to the document data.

The suggestion option may be at least one output option that satisfies the pre-set resource saving set value or at least one combination of the at least one output option.

The controller may calculate the resource saving value corresponding to the output option to be applied to the document data and the pre-set resource saving set value as a saving cost and display the saving cost.

If a user command to change the pre-set resource saving set value is input by manipulating a scroll bar or inputting a numerical value, the controller may display a suggestion option that corresponds to the resource saving set value which is changed according to the user command.

The document data to be output may include at least one of pre-stored document data, printing data received from the external apparatus connected to the image forming apparatus, received fax data, received e-mail, a document to be copied, and a document to be scanned.

A screen to display the suggestion option may be displayed as a separate window from a currently displayed screen.

The foregoing and/or other aspects may be achieved by providing a printing control terminal apparatus which supports a resource saving mode and is connected to an image forming apparatus which outputs document data, the printing control terminal apparatus including: a communication interface to communicate with the image forming apparatus, a user interface to select the document data to be output through the image forming apparatus and select one of a plurality of output options to be applied to the selected document data, a display unit to display at least one suggestion option to save resources, and a controller to compare a resource saving value corresponding to the output option to be applied to the document data and a resource saving set value which is pre-set in the image forming apparatus, and control the display unit to display the at least one suggestion option to save the resource of the document data according to a result of the comparison.

The image forming apparatus may output the document data according to a suggestion option that is selected from among the at least one suggestion option displayed on the display unit, through the user interface.

If the resource saving value corresponding to the output option to be applied to the document data is less than the pre-set resource saving set value, the controller may control the suggestion option to be displayed.

The suggestion option may be at least one output option that satisfies the pre-set resource saving set value or at least one combination of the at least one output option.

The controller may calculate the resource saving value corresponding to the output option to be applied to the document data and the pre-set resource saving set value as a saving cost, and display the saving cost.

If a user command to change the pre-set resource saving set value is input by manipulating a scroll bar or inputting a numerical value, the controller may display a suggestion option that corresponds to the resource saving set value which is changed according to the user command.

Accordingly, resources used to perform a job of the image forming apparatus can be saved and also user's convenience can be improved.

BRIEF DESCRIPTION OF THE DRAWINGS

These and/or other aspects and advantages will become apparent and more readily appreciated from the following description of the embodiments, taken in conjunction with the accompanying drawings of which:

FIGS. 6A and 6B are views illustrating tables which are pre-stored to calculate a cost needed for a corresponding job in various exemplary embodiments;

DETAILED DESCRIPTION

Figure 1:
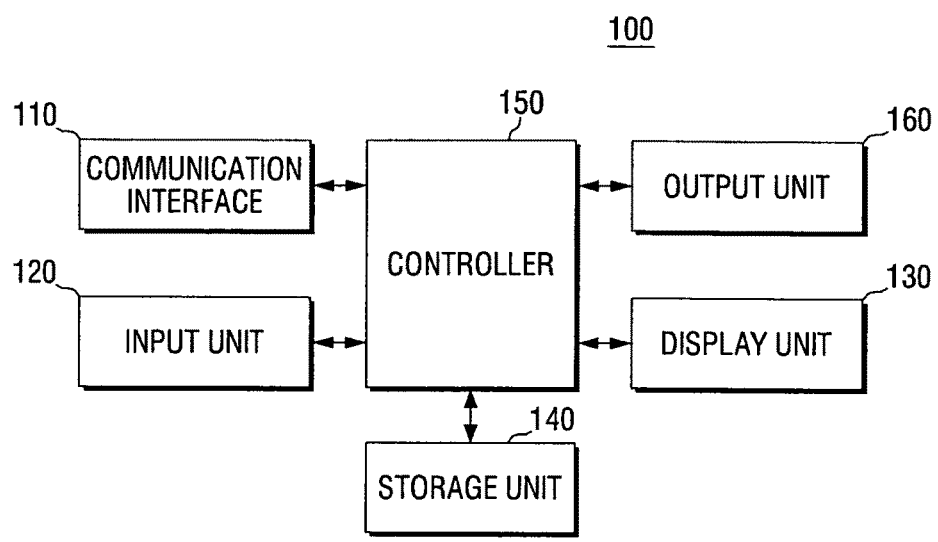
FIG. 1 is a block diagram illustrating an image forming apparatus according to an exemplary embodiment.

Reference will now be made in detail to the present embodiments, examples of which are illustrated in the accompanying drawings, wherein like reference numerals refer to the like elements throughout. The embodiments are described below in order to explain the embodiments by referring to the figures.

FIG. 1 is a block diagram illustrating an image forming apparatus 100 according to an exemplary embodiment. Referring to FIG. 1, the image forming apparatus 100 includes a communication interface 110, an input unit 120, a display unit 130, a storage unit 140, a controller 150, and an output unit 160.

The image forming apparatus 100 can be connected to an external apparatus, supports a resource saving mode, and has a function of outputting document data, and it is realized as a printer, a scanner, a copier, and a multifunction peripheral incorporating at least two functions of the aforementioned devices.

The communication interface 110 supports data communication with an external apparatus (not shown) through a network. For example, the communication interface 110 supports a digital living network alliance (DLNA) network, a local area network (LAN), or the internet.

The input unit 120 has a plurality of function keys which enable a user to set or select various functions supported by the image forming apparatus 100, and receives a command from the user. Also, the input unit 120 is realized as a device realizing input and output simultaneously, such as a touch pad. In particular, the input unit 120 receives a user command to apply a resource saving mode. For example, the input unit 120 receives a user command to select an output option which will be applied to document data to be output. The document data to be output, recited herein, may include at least one of pre-stored document data, printing data received from an external apparatus connected to the image forming apparatus 100, received fax data, received E-mail, a document to be copied, or a document to be scanned.

The display unit 130 displays information provided by the image forming apparatus 100, a status of a job which is being in progress in the image forming apparatus 100 and a result thereof. A user identifies diverse printing jobs of the image forming apparatus 100 and controls managing the jobs through the display unit 120. More specifically, the display unit 130 may be controlled by the controller 150, which will be described below, to display at least one suggestion option for saving resources. The suggestion option recited herein may be at least one output option that satisfies a pre-set resource saving set value or at least one combination of the at least one output option. However, it is understood that a resource saving set value may be changed by the user. Also, the output option may include at least one of options for saving resources, that is, a duplex output option, a multiple-pages-per-sheet output option, a size reduction printing option, a monochrome output option, a toner saving/density control option, a printing quality/resolution option, a batch output option, a blank page deletion option, and a background deletion option. These output options may be set as a default value by a manufacturer of the image forming apparatus 100 and may be upgraded using a program. The printing quality/resolution option is to determine a physical resolution for printing and is to change the resolution by changing the number of dots used per 1 inch (dpi). The other options are well-known to an ordinary skilled person in the related art and thus detailed description thereof is omitted. A screen to display the suggestion option may be displayed as a separate window from a currently displayed screen.

The display unit 130 may be controlled by the controller 150 to display a resource saving set value in the form of a scroll bar (or an eco slider). The form of a scroll bar recited herein refers to a form that can adjust a resource saving set value using a cursor, and is similar to a slider form. Also, the display unit 130 may be controlled by the controller 120 to display a resource saving rate in the form of a percentage (%). Also, a resource saving set value that can be presented as a suggestion option for an output document (or a job) may be set in the form of a level (for example, a pre-set percentage unit: 10%, 20%, 30%). However, this should not be considered as limiting and any form can be applied that can represent a saving rate. Also, the display unit 130 may be controlled by the controller 150 to display a resource saving rate in the form of a graph. The graph may be changed according to a change in the resource saving rate. The display unit 130 may be realized as a touch screen incorporated in the input unit 120.

The storage unit 140 stores a unit cost calculating a cost corresponding to the resource saving set value. Also, the storage unit 140 may store $CO_2$ emission per unit, for example, may store $CO_2$ emission per sheet if each option is applied. Also, the storage unit 140 may store related data so as to separately apply different categories such as paper saving, toner saving, and energy saving categories. Also, the storage unit 140 may store output options (for example, a toner saving option or a resolution option) corresponding to a certain image forming job (for example, a printing job) and attribute values applicable to the output options (for example, an output density level and a resolution level). Also, the storage unit 140 may store a suggestion option list corresponding to a resource saving set value in a resource saving mode. The storage unit 140 may be realized as an internal storage medium or an external storage medium of the image forming apparatus 100, such as a removable disk including a USB memory, a storage medium connected to a host, and a web server linked through a network.

The controller 150 controls operation of the respective components of the image forming apparatus 100 according to pre-stored diverse programs. In particular, the controller 150 may compare a resource saving value which corresponds to an output option to be applied to target document data and a resource saving set value which is in the image forming apparatus 100, and control the display unit 130 to display at least one suggestion option saving resources of the document data according to a result of comparison.

Also, the controller 150 may control the output unit 160 to output the document data according to a suggestion option that is selected from among the suggestion options displayed on the display unit 130. Also, if the resource saving value corresponding to the output option to be applied to the document data is less than the resource saving set value, the controller 150 may control the suggestion option to be displayed. On the other hand, if the resource saving value corresponding to the output option to be applied to the document data is greater than or equal to the resource saving set value, the controller 150 may control the job to be performed without displaying the suggestion option. Also, in some situation, even if the resource saving value corresponding to the output option to be applied to the document data is greater than or equal to the resource saving set value, the controller 150 may control related information to be displayed so that a user can check the information. The resource saving value corresponding to the output option to be applied to the document data, recited herein, refers to a resource saving value that can be obtained with respect to the document data in a currently set output environment. The resource saving set value may refer to a value that is set as a default value by an administrator according to an office policy, for example.

Also, the controller 150 may calculate the resource saving value which corresponds to the output option to be applied to the document data. Also, the controller 150 may calculate and display the resource saving value, which corresponds to the output option to be applied to the document data, and the resource saving set value, as a saving cost or $CO_2$ emission. If a user command to change the resource saving set value is input by manipulating a scroll bar or inputting a numerical value, the controller 150 may display a suggestion option that corresponds to a resource saving set value changed according to the user command. The suggestion option to be applied to the document data may be set by the controller 150. However, the suggestion option may be set as a default value or may be edited by the user in some situation. Also, the controller 120 may calculate the resource saving value corresponding to the output option to be applied to the document data and the pre-set resource saving set value as a cost or $CO_2$ emission using a stored unit cost table.

The output unit 160 outputs the document data according to a suggestion option that is selected from among the suggestion options displayed on the display unit 130. The output unit 160 converts the document data into image data which can be output, and prints the image data on a recording medium. For example, in the case of a laser type image forming apparatus, a surface of an organic photoconductive (OPC) drum (not shown) is electrically charged by a charging unit (not shown) and a latent image is formed on a charged area by a laser scanning unit (LSU) (not shown). The latent image is developed by a developing unit (not shown) and a toner is attached to the latent image. The toner image is transferred to paper by a transferring unit (not shown) and is fused to the paper by a fusing unit (not shown). However, this is merely an example and the embodiment can be applied to an ink-jet type image forming apparatus. Although applying the resource saving mode is controlled by the components included in the image forming apparatus 100 in the above embodiment, all of the functions described above may be controlled by a printer driver (not shown) or an application (not shown) provided in a host device (not shown) connected to the image forming apparatus 100. This will be explained with reference to FIG. 2.

Figure 2:
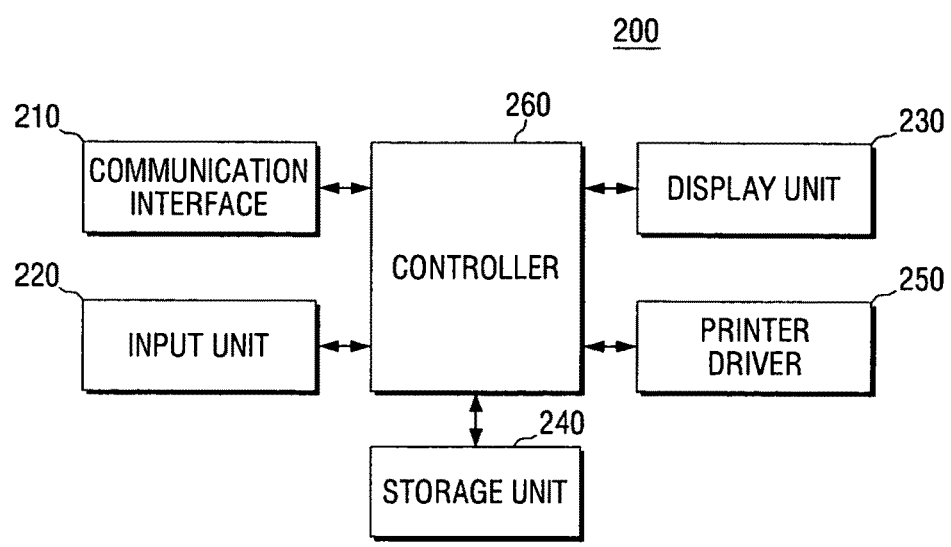
FIG. 2 is a block diagram illustrating a printing control terminal apparatus according to an exemplary embodiment.

FIG. 2 is a block diagram illustrating a printing control terminal apparatus according to an exemplary embodiment.

A printing control terminal apparatus 200 illustrated in FIG. 2 supports a resource saving mode and is connected to an image forming apparatus which outputs document data. The printing control terminal apparatus 200 includes a personal computer, a laptop computer, a personal digital assistant (PDA), a portable multimedia player (PMP), or a mobile phone.

A communication interface 210 is connected to at least one image forming apparatus and provides printing data which has been converted with respect to a printing job (converted document data and selected output option information) to the image forming apparatus. More specifically, the communication interface 210 is designed to connect the printing control terminal apparatus 200 to the image forming apparatus and may be realized as a parallel port, a universal serial bus (USB) port, or a wireless module.

An input unit 220 includes a plurality of function keys that enable a user to set or select diverse functions supported by the printing control terminal apparatus 200, and may be realized as a device realizing input and output simultaneously such as a touch pad, or a mouse. Using the input unit 220, the user selects document data to be output through the image forming apparatus connected to the printing control terminal apparatus 200 via the communication interface 210, and selects an output option to be applied to the selected document data.

A display unit 230 displays information provided by the printing control terminal apparatus 200. In particular, the display unit 230 may display at least one suggestion option saving resources in outputting the selected document data. Also, the information displayed on the display unit 230 and its display format are the same as those of the display unit 130 of the image forming apparatus 100 of FIG. 1, and thus detailed description thereof is omitted.

A storage unit 240 may store information about the image forming apparatus 100 which is received from the communication interface 210. The storage unit 240 may temporarily store printing data which is generated by a printer driver 250 which will be described below, and may pre-store a script which stores a printing option supported by each image forming apparatus and information about a supported print language.

The printer driver 250 includes a plurality of drivers corresponding to a plurality of languages and performs printing jobs with respect to a plurality of image forming apparatus which operate in different languages. More specifically, if a user wishes to print a document created by an application, the printer driver 250 creates printing data using a print language which is perceivable by an image forming apparatus the user wishes to use to print the document. A controller 260 controls a component which is necessary to perform a printing job using the printer driver 250 according to an output option selected through the image forming apparatus. More specifically, the controller 260 compares a resource saving value which corresponds to an output option to be applied to document data and a resource saving set value which is in the image forming apparatus, and controls the display unit 230 to display at least one suggestion option saving resources of the document data according to a result of comparison. Also, if the resource saving value corresponding to the output option to be applied to the document data is less than the resource saving set value, the controller 260 may control the display unit 230 to display a suggestion option. The suggestion option may be at least one output option that satisfies the resource saving set value or a combination of the at least one output options. Also, the printing control terminal apparatus 200 can perform the configuration of the image forming apparatus 100 of FIG. 1 within a range of an image forming job that can be achieved using the printer driver 250, and thus detailed description thereof is omitted.

Figure 3:
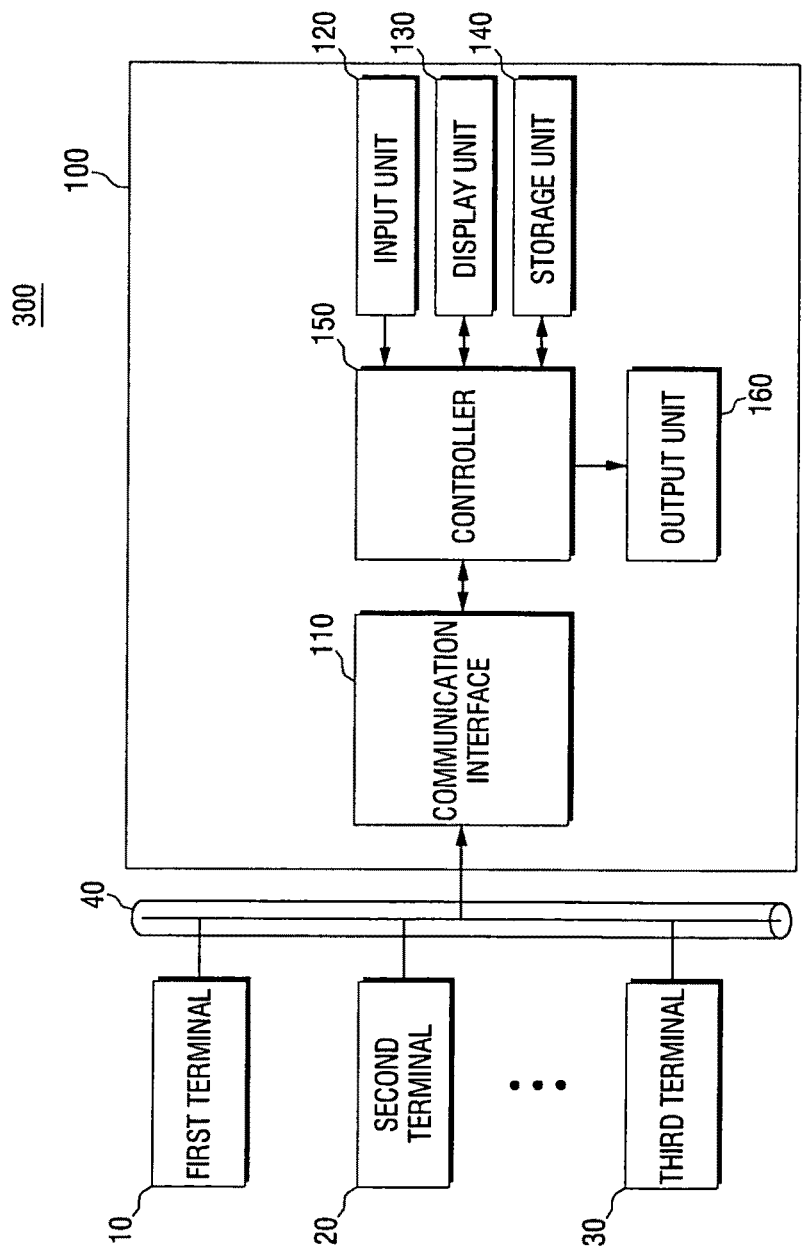
FIG. 3 is a block diagram illustrating a resource saving system according to an exemplary embodiment.

FIG. 3 is a block diagram illustrating a resource saving system according to an exemplary embodiment. A resource saving system 300 illustrated in FIG. 3 includes an image forming apparatus 100, external terminal apparatuses 10 to 30, and a network 40. The same components as those of FIGS. 1 and 2 are not described.

The image forming apparatus 100 adopts the same configuration as that of FIG. 1. Also, the image forming apparatus 100 may receive printing data from the printing control terminal apparatus illustrated in FIG. 2 and output the printing data.

The image forming apparatus 100 may be connected to the plurality of external terminal apparatuses 10 to 30 through the network 40. The network 40 recited herein may be realized as a DLNA network, a LAN, or the internet. More specifically, the communication interface 110 may communicate with the communication interface of each of the plurality of external terminal apparatuses 10 to 30 through a DLNA network, a LAN, or the Internet.

At least one of the external terminal apparatuses 10 to 30 may be realized as an administration server. The administration server may be a network administrator of an office. The administration server may set the resource saving set value as a default value. However, the resource saving set value may be set to be changed by the user. Also, the administration server may set only some of diverse output options to be applied and the other options not to be applied. Also, accessibility of the output option to the user may be set or changed by the administration server. Also, an attribute value applied to the at least one output option may be set as a default value. Also, the administration server may set the resource saving set value, which has been set as a default value, to be changed if a password is authenticated. Also, the administration server may set a different resource saving set value for each image forming job and also may set the resource saving set value to be changed through a different password authentication procedure. Also, the administration server may set a different password for each option that is applied when the resource saving mode is selected. The administration server may control setting/changing a resource saving rate and setting/changing a password, using a network server or an embedded web server, or using the image forming apparatus 100.

At least one of the plurality of external terminal apparatuses 10 to 30 may be the printing control terminal apparatus 200 illustrated in FIG. 2. Also, the external terminal apparatus 10 to 30 may be an external terminal apparatus which transmits target document data to the image forming apparatus 100 illustrated in FIG. 1. Also, even if the external terminal apparatus 10 to 30 is the printing control terminal apparatus 200 illustrated in FIG. 2 or the external terminal apparatus which transmits target document data to the image forming apparatus 100 illustrated in FIG. 1, the external terminal apparatus 10 to 30 can perform the aforementioned function of the administration server. The plurality of external terminal apparatuses 10 to 30 may be realized as a personal computer, a laptop computer, a PDA, a PMP, or a mobile phone.

Figure 4A:
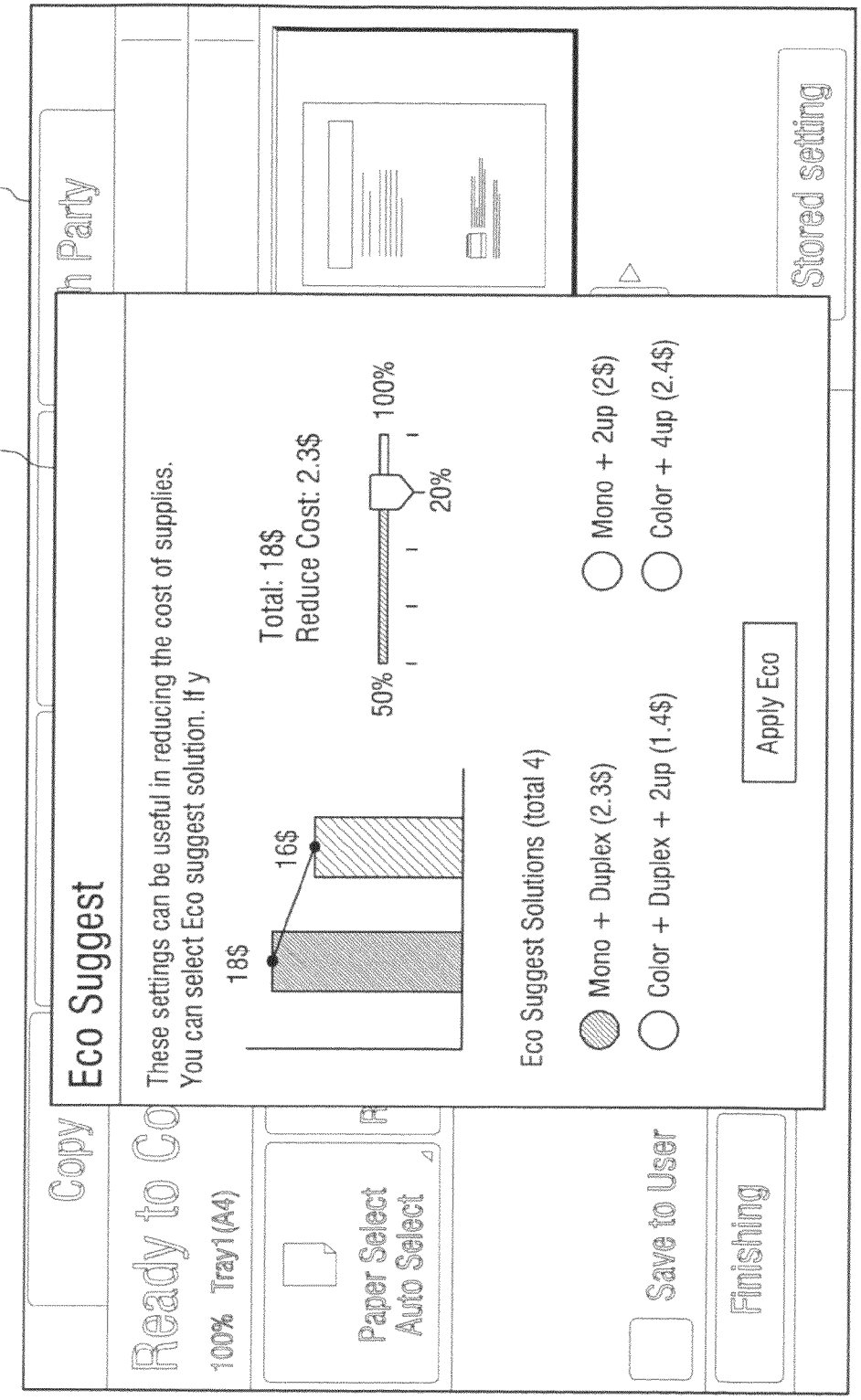
FIGS. 4A and 4B are views provided to explain an eco suggestion function according to an exemplary embodiment.
Figure 4B:
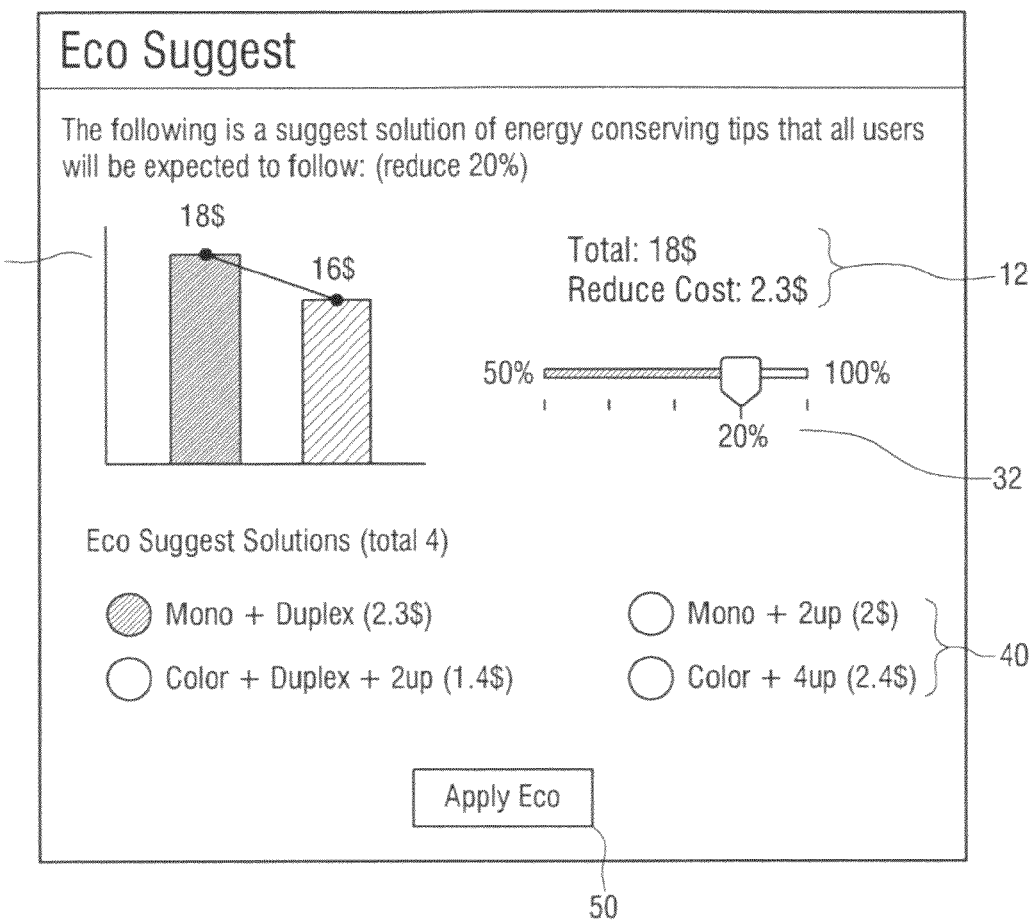

FIGS. 4A and 4B are views provided to explain an eco suggestion function according to an exemplary embodiment.

Referring to FIG. 4A, if a user command to perform an image forming job (to output target document data) is input in a state where a resource saving set value is by an administration server, a screen including at least one suggestion option suggested to apply the resource saving set value (hereinafter, referred to as an eco suggestion screen or an eco suggestion window) is displayed. The suggestion option to apply the resource saving set value is displayed only if a resource saving set value to be applied according to a selected output option is less than the resource saving set value. As shown in FIG. 4A, an eco suggestion screen 500 may be displayed as a separate window from a current job window 1000. In some situations, a current task window may be converted into an eco suggestion screen. In this case, the eco suggestion screen can be promptly converted into the current job window.

Referring to FIG. 4B, the eco suggestion screen 500 may display a total cost ($18) corresponding to an output option to be applied to target document data, and a saved cost ($2.3) corresponding to a resource saving set value, in the form of a total cost and cost savings 12. Also, the eco suggestion screen 500 may display the total cost ($18) corresponding to the output option to be applied to the target document data and the saved cost corresponding to the resource saving set value, in the form of a graph 22. Also, the eco suggestion screen 500 may display the resource saving set value (20% or $2.3) on a scroll bar 32, and change the pre-set resource saving set value by moving the scroll bar under the pre-set resource saving set value (20%). Also, a user can directly input the resource saving set value (20% or $2.3). Also, the eco suggestion screen 500 may display a plurality of suggestion options 40 which are suggested for the resource saving set value (20%).

Each suggestion option may include a cost that can be saved for a corresponding image forming job. In this case, the resource saving set value or cost corresponding to the suggested option does not have to be identical to the resource saving set value or cost, and falls within a pre-set error range. If the pre-set resource saving set value is 100%, the eco suggestion function cannot be presented and a message "Printing Not Allowed" or "No Suggestion Option Exists" may be displayed. Also, even when the set resource saving rate is not 100%, if a suggestion solution cannot be presented, the same message as that of the resource saving rate of 100% may be displayed. Also, the eco suggestion screen 500 may display an eco apply button 50 to apply the suggestion option selected by the user.

Figure 5A:
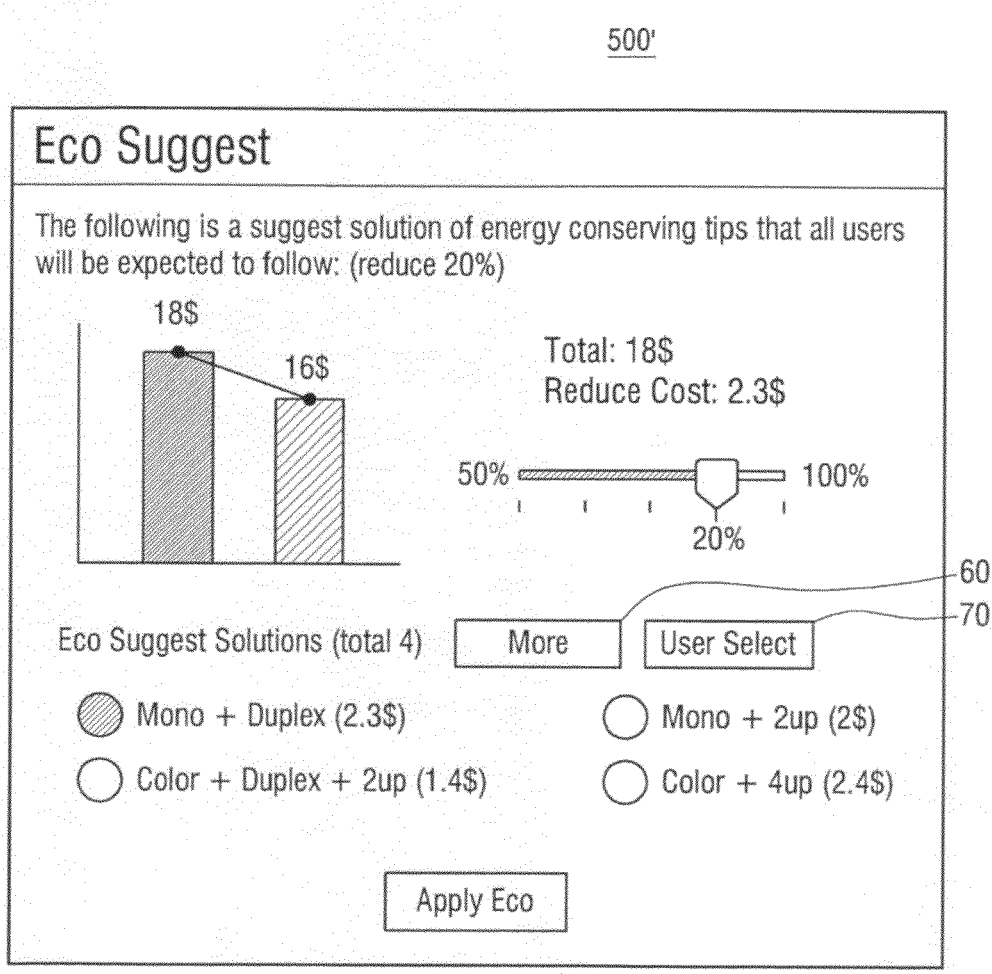
FIGS. 5A and 5B are views provided to explain an eco suggestion function according to another exemplary embodiment.
Figure 5B:
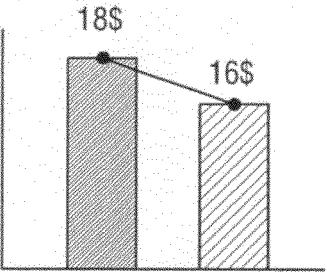

FIGS. 5A and 5B are views provided to explain an eco suggestion function according to another exemplary embodiment.

Referring to FIG. 5A, an eco suggestion screen 500' includes a menu button 60 to display additional suggestion options that is suggested for a pre-set resource saving set value, and a menu button 70 to allow a user to select an output option other than a suggested option. More specifically, the eco suggestion screen 500' preferentially displays a suggestion option which is preferred or has a priority with respect to a pre-set resource saving set value, and also separately displays the additional display menu button 60 to display additional suggestion options and the user selection menu button 70 to allow the user to select his/her favorite option to apply an eco function when the user wishes to select the other option. FIG. 5B illustrates an eco suggestion screen 600 if the user selection menu button 70 is pressed in FIG. 5A. Referring to FIG. 5B, if an output option selected by the user satisfies a pre-set saving rate, an eco apply button 80 is activated so that the output option is selected. If the output option selected by the user does not satisfy the pre-set saving rate, the eco apply button 80 is deactivated so that the output option is not selected. In this case, the user can select another output option to re-configure the option or return to a previous eco suggestion screen (FIG. 5A) to select the suggestion option. In this case, an error range for the cost can be applied as described above.

FIGS. 6A and 6B are views illustrating tables which are pre-stored to calculate a cost needed for a corresponding image forming job in diverse exemplary embodiments.

Referring to FIG. 6A, a toner price for each color is determined and the number of copies that can be printed for each toner is approximately calculated. This basic information is stored in a database. If a toner price for each color, a price for the number of printable copies, and a paper price are input, a unit cost used to perform diverse calculations using a corresponding application is calculated. Referring to FIG. 6B, a unit cost, such as a toner price per page and a paper price per page, is calculated based on the toner price and the paper price calculated in the above method of FIG. 6A, in the cases of color printing and monochrome printing, and the unit cost is stored in the data base. The image forming apparatus according to an exemplary embodiment makes a combination of suggestion options that satisfies a pre-set resource saving set value with respect to an image forming job, based on the unit cost shown in FIG. 6B, and provides the combination.

FIGS. 7A to 7D are views provided to explain an eco suggestion function according to still another exemplary embodiment. Referring to FIGS. 7A to 7D, a resource saving rate is expressed by a $CO_2$ reduction rate. However, this is merely an example. Even if the resource saving rate is expressed by cost as in the above embodiment, the same method is applied.

Figure 7A:
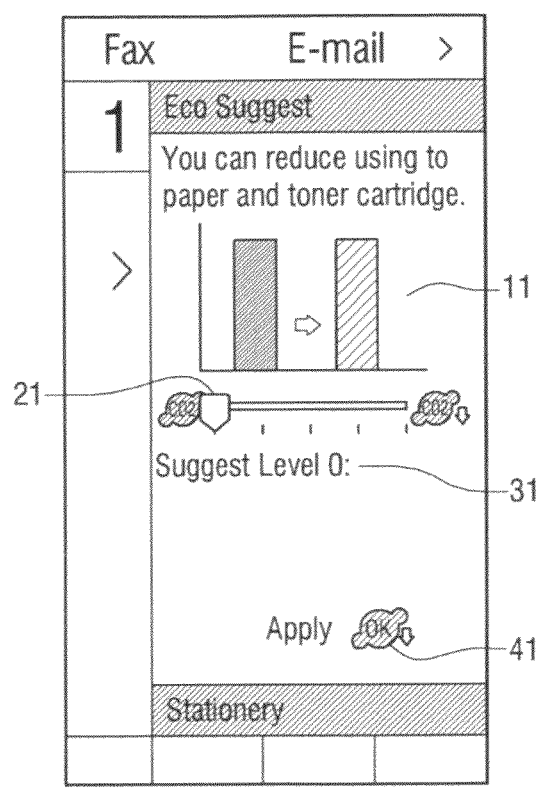
FIGS. 7A to 7D are views provided to explain an eco suggestion function according to still another exemplary embodiment.
Figure 7B:
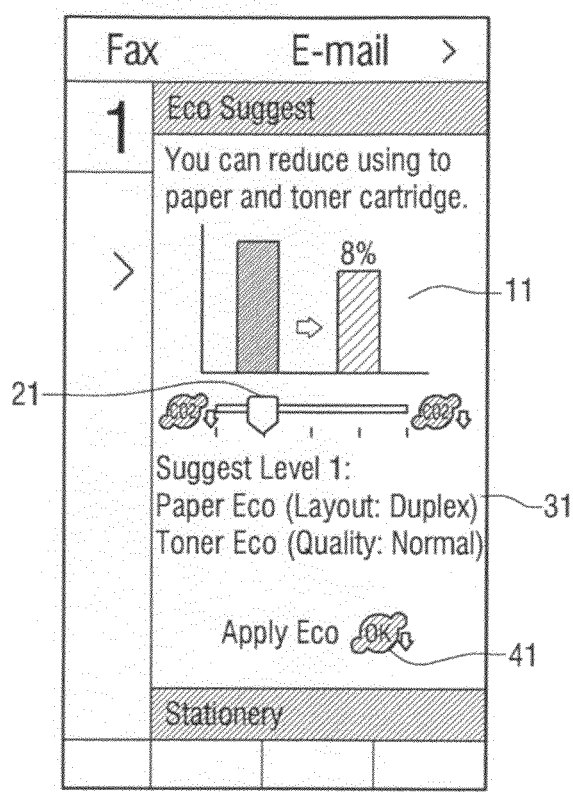
Figure 7C:
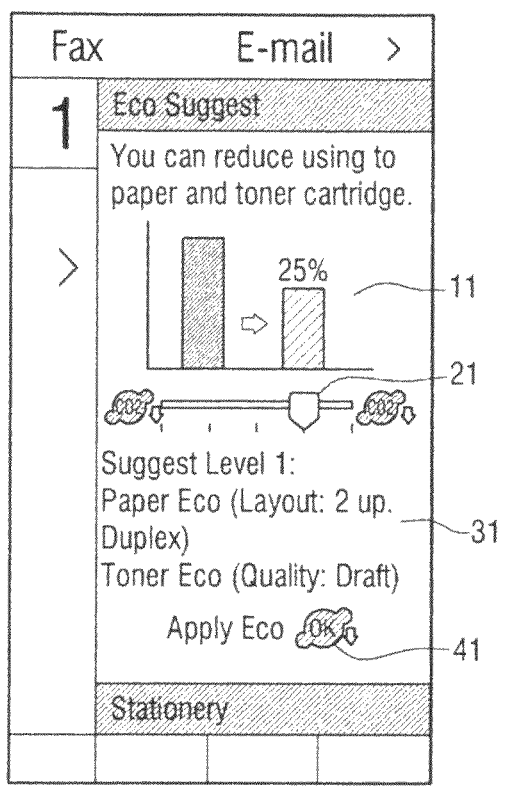

According to an embodiment illustrated in FIGS. 7A to 7C, screens of FIGS. 7A to 7C are displayed along with the screen illustrated in FIGS. 4A to 5B so that a user can check an eco function list according to a saving rate. In the embodiment explained in FIGS. 7A to 7C, a resource saving rate is expressed by cost and $CO_2$ emission. If either one, a resource saving rate expressed by cost or a resource saving rate expressed by $CO_2$ emission is satisfied, a corresponding image forming job can be performed. In this embodiment, the screens illustrated in FIGS. 7A to 7C are displayed along with the screen illustrated in FIGS. 4A to 5B. Also, the embodiment illustrated in FIGS. 7A to 7C is applied to the case where a user arbitrarily sets a resource saving rate.

Referring to FIG. 7A, if a $CO_2$ reduction rate is set to be 0% by moving a cursor 21 on a scroll bar to the left end, an eco function is not applied. In this case, the $CO_2$ reduction rate is also expressed by a graph 11 representing the percentage. Referring to FIG. 7B, if the $CO_2$ reduction rate is set to be 8% by moving the cursor 21 on the scroll bar to the right, a suggestion option corresponding to the $CO_2$ reduction rate of 8% is displayed. In this state, if the user selects an eco apply button 41, a corresponding eco level 31 is applied. Referring to FIG. 7C, if the $CO_2$ reduction rate is set to be 25% by further moving the cursor 21 on the scroll bar to the right, an eco function suggested for the $CO_2$ reduction rate of 25% is displayed. In this state, if the user selects the eco apply button 41, a corresponding eco level 31 is applied. In the state illustrated in FIGS. 7B and 7C, if the resource saving rate is set to 0% by moving the cursor 21 on the scroll bar to the left end and the eco apply button 41 is selected, the eco function is canceled.

Figure 7D:
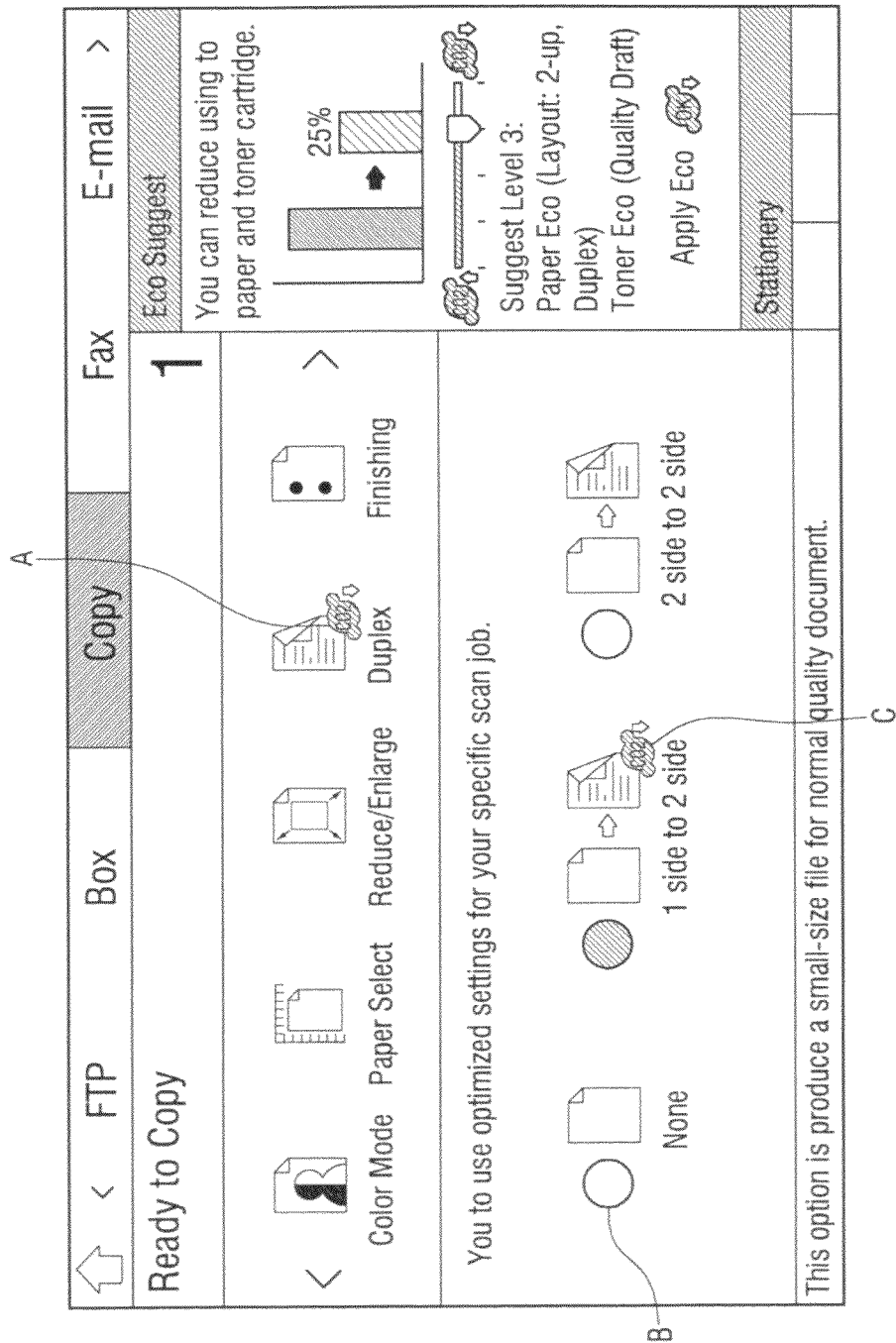

FIG. 7D illustrates another embodiment of the state of FIG. 7C. Referring to FIG. 7D, if a target image forming job is a printing job, an eco icon 'A' is placed on the option "Duplex" which is applied to a corresponding eco function so that a user can easily identify the set option. Also, the same eco icon 'C' is placed on a sub-option (1side to 2side) of the corresponding option. In this case, if a user selects another option B, the currently set eco level 31 may be canceled.

Figure 8:
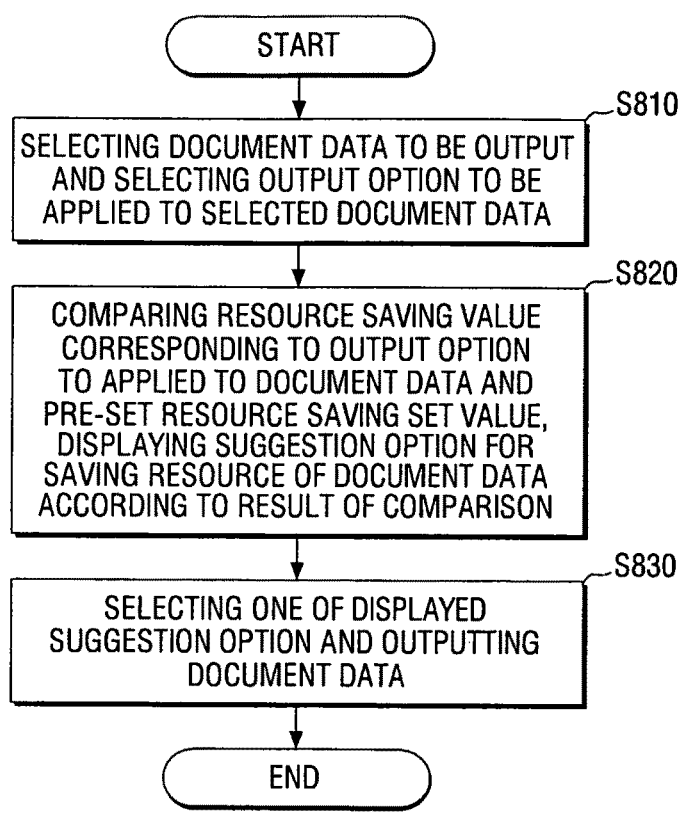
FIG. 8 is a flowchart illustrating a method for providing a resource saving mode according to an exemplary embodiment.

FIG. 8 is a flowchart illustrating a method of providing a resource saving mode according to an exemplary embodiment.

According to a control method of an image forming apparatus which is connectable to an external apparatus, supports a resource saving mode, and outputs document data, document data to be output is selected and an output option to be applied to the selected document data is selected (S810). Next, a resource saving value corresponding to the output option to be applied to the document data is compared with a resource saving set value which is pre-set in the image forming apparatus, and at least one suggestion option saving resources of the document data is displayed according to a result of comparison (S820). One of the suggestion options is selected and the document data is output (S830). Detailed configuration and embodiment of each operation are described above and thus are omitted.

An effect incurring when a resource saving mode is activated in an image forming apparatus, for example, saving details of the image forming apparatus are presented to the administrator or the user (or presented as a report) in comparison with those of a general image forming apparatus. The saving details for each job and each quarter, month, and year are provided to the administrator or the user on a real time basis. Accordingly, the administrator or the user can obtain a feedback resulting from application of a resource saving function.

According to the diverse exemplary embodiments described above, active participation of a user is derived so that a negative effect caused by passive participation when a resource saving mode is applied can be offset and also an administrator can obtain a cost effect by saving consumables. From a standpoint of a related-product seller, there is an effect of relieving environmental consumption.

Although a few embodiments have been shown and described, it would be appreciated by those skilled in the art that changes may be made in this embodiment without departing from the principles and spirit of the invention, the scope of which is defined in the claims and their equivalents.

What is claimed is:

1. A control method of an image forming apparatus which is connectable to an external apparatus, supports a resource saving mode, and outputs document data, the control method comprising:
    selecting the document data to be output;
    selecting an output option from among output options to be applied to the selected document data;
    comparing a resource saving value corresponding to the selected output option to be applied to the document data and a resource saving set value;
    displaying at least one suggestion option, which saves resources, of the document data according to a result of the comparing, wherein the at least one suggestion option is associated with the resource saving set value;
    receiving a user input command to change the resource saving set value, comprising inputting by manipulating a scroll bar or inputting a numerical value;
    outputting the document data according to the at least one selected suggestion option corresponding to the changed resource saving set value; and
    displaying a total cost of the resource saving value corresponding to the selected output option to be applied to the document data and the changed resource saving set value, associated with the at least one selected suggestion option, as a saving cost,
    wherein if the resource saving set value is changed according to the user input command, displaying the at least one suggestion option corresponding to the changed resource saving set value.

2. The control method as claimed in claim 1, wherein the displaying the at least one suggestion option comprises displaying the at least one suggestion option if the resource saving value corresponding to the output option to be applied to the document data is less than the resource saving set value.

3. The control method as claimed in claim 1, wherein the output option comprises at least one of a duplex output option, a multiple-pages-per-sheet output option, a size reduction printing option, a monochrome output option, a toner saving/density control option, a printing quality/resolution option, a batch output option, a blank page deletion option, and a background deletion option, or combinations thereof.

4. The control method as claimed in claim 1, further comprising calculating the resource saving value corresponding to the output option to be applied to the document data.

5. The control method of claim 4, further comprising:
    calculating a sum of a plurality of the resource saving values over a time period.

6. The control method of claim 5, further comprising providing the calculated sum to an administrator or a user.

7. The control method as claimed in claim 1, wherein the at least one suggestion option is at least one output option that satisfies the resource saving set value or at least one of a combination of the output options.

8. The control method as claimed in claim 1, wherein the document data to be output comprises at least one of pre-stored document data, printing data received from the external apparatus connected to the image forming apparatus, received fax data, received e-mail, a document to be copied and a document to be scanned, or combinations thereof.

9. The control method as claimed in claim 1, further comprising displaying a screen to display the suggestion option as a separate window from a currently displayed screen.

10. The control method of claim 1,
    wherein the savings cost is based on a comparison of the resource saving value corresponding to the selected output option and the changed resource saving set value associated with the selected suggestion option,
    wherein the document data according to the selected output option is not output to the image forming apparatus.

11. An image forming apparatus which is connectable to an external apparatus, supports a resource saving mode, and outputs document data, the image forming apparatus comprising:
    a communication interface to communicate with the external apparatus;
    an input unit to select the document data to be output and select an output option from a plurality of output options to be applied to the selected document data;
    a display unit to display suggestion options to save resources;
    an output unit to output the document data according to a suggestion option that is selected from among the displayed suggestion options; and a controller to compare a resource saving value corresponding to the selected output option to be applied to the document data and a resource saving set value, corresponding to the suggestion option, which is in the image forming apparatus, to control the display unit to display the suggestion option, which saves resources, of the document data according to a result of the comparison, and to control the output unit to output the document data according to the suggestion option that is selected from among the displayed suggestion options, wherein, if a user command to change a pre-set resource saving set value is input by manipulating a scroll bar or inputting a numerical value, the controller displays a total cost of the selected output option and the suggestion option that corresponds to the resource saving set value which is changed according to the user command, and wherein the controller calculates the resource saving value corresponding to the selected output option to be applied to the document data and the changed resource saving set value as a saving cost and controls the display unit to displays the saving cost.

12. The image forming apparatus as claimed in claim 11, wherein the controller controls the suggestion option to be displayed if the resource saving value corresponding to the selected output option to be applied to the document data is less than the resource saving set value.

13. The image forming apparatus as claimed in claim 11, wherein the output option comprises at least one of a duplex output option, a multiple-pages-per-sheet output option, a size reduction printing option, a monochrome output option, a toner saving/density control option, a printing quality/resolution option, a batch output option, a blank page deletion option, and a background deletion option, or combinations thereof.

14. The image forming apparatus as claimed in claim 11, wherein the controller calculates the resource saving value corresponding to the selected output option to be applied to the document data.

15. The image forming apparatus as claimed in claim 11, wherein the suggestion option is at least one output option that satisfies a pre-set resource saving set value or a combination of the output options.

16. The image forming apparatus as claimed in claim 11, wherein the document data to be output comprises at least one of pre-stored document data, printing data received from the external apparatus connected to the image forming apparatus, received fax data, received e-mail, a document to be copied, a document to be scanned, or combinations thereof.

17. The image forming apparatus as claimed in claim 11, wherein the display unit displays a screen to display the suggestion option, displayed as a separate window from a currently displayed screen.

18. A printing control terminal apparatus which supports a resource saving mode and is connected to an image forming apparatus which outputs document data, the printing control terminal apparatus comprising:

a communication interface to communicate with the image forming apparatus;

a user interface to select the document data to be output through the image forming apparatus and to select an output option of a plurality of output options to be applied to the selected document data;

a display unit to display at least one suggestion option to save resources; and a controller to compare a resource saving value corresponding to the selected output option to be applied to the document data and a resource saving set value which is in the image forming apparatus, and to control the display unit to display the at least one suggestion option to save the resource of the document data according to a result of the comparison, and to receive a user input command to change the resource saving set value, comprising inputting by manipulating a scroll bar or inputting a numerical value displayed on the user interface, wherein if the resource saving set value is changed according to the user input command, the controller controls the user interface to display the at least one suggestion option corresponding to the changed resource saving set value and a total cost associated with the selected output option, and wherein the controller calculates the resource saving value corresponding to the output option to be applied to the document data and the changed resource saving set value as a saving cost and displays the saving cost.

\* \* \* \* \*